United States Patent [19]

Huffman et al.

[11] Patent Number: 4,553,892
[45] Date of Patent: Nov. 19, 1985

[54] SELF ALIGNING, LOAD CAPACITY ENHANCING, WORKPIECE HANDLING DEVICE FOR USE WITH A ROBOTIC SYSTEM

[75] Inventors: James Huffman, Boulder; Kim Brandt, Lafayette; Alton G. Doutre, Westminster, all of Colo.

[73] Assignee: Storage Technology Corporation, Louisville, Colo.

[21] Appl. No.: 435,149

[22] Filed: Oct. 19, 1982

[51] Int. Cl.[4] .................................................. B65G 59/04
[52] U.S. Cl. .................................... 414/121; 294/64.1; 901/40; 901/45; 414/737; 414/744 B; 414/752; 414/589
[58] Field of Search ............... 414/121, 589, 590, 627, 414/744 B, 752, 754, 737; 294/64 R, 65; 137/580; 901/40, 45

[56] References Cited

U.S. PATENT DOCUMENTS

| | | | |
|---|---|---|---|
| 3,765,542 | 10/1973 | White | 414/754 |
| 3,957,263 | 5/1976 | Christl | 294/64 R |
| 4,078,671 | 3/1978 | Lundström | 294/64 R |
| 4,266,905 | 5/1981 | Birk et al. | 901/45 |

OTHER PUBLICATIONS

Haney, et al, 10/1980, IBM Tech. Disc. Bull., vol. 23, No. 5.
Fletcher et al, 4/1979, IBM Tech. Disc. Bull., vol. 21, No. 11.

Primary Examiner—Terrance L. Siemens
Attorney, Agent, or Firm—Ronald C. Williams; James R. Young

[57] ABSTRACT

A robot arm attachment tool for handling workpieces, such as information recording disks. The tool is self aligning, has enhanced load handling load capacities and is able to handle workpieces having sensitive surfaces without damage to same. The tool is attached to the robot arm so as to allow the main portion of the tool to translate freely in a horizontal plane and to freely pivot about a center axis of the tool. The tool centers itself over a workpiece to be lifted, and has a pressurizable chamber having a piston for allowing powered removal of workpieces which is connected to housings which in turn engage workpieces to be lifted. In operation, the robot arm first generally centers and lowers the tool over the workpiece. The tool then precisely centers itself over the workpiece. The free attachment of the tool allows the tool to tilt and translate in a horizontal plane as the tool comes in contact with the workpiece, for a precise fit. Once the tool has fully engaged the workpiece, the robot arm senses the stop motion, and stops. At this point a negative pressure system is activated securely fastening the workpiece to the tool. The chamber is then pressurized, causing the housing to rise relative to the piston raising the workpiece off its mounting structure. Once the workpiece has cleared the mounting structure, the robot arm is activated and the workpiece moved to the new location.

22 Claims, 10 Drawing Figures

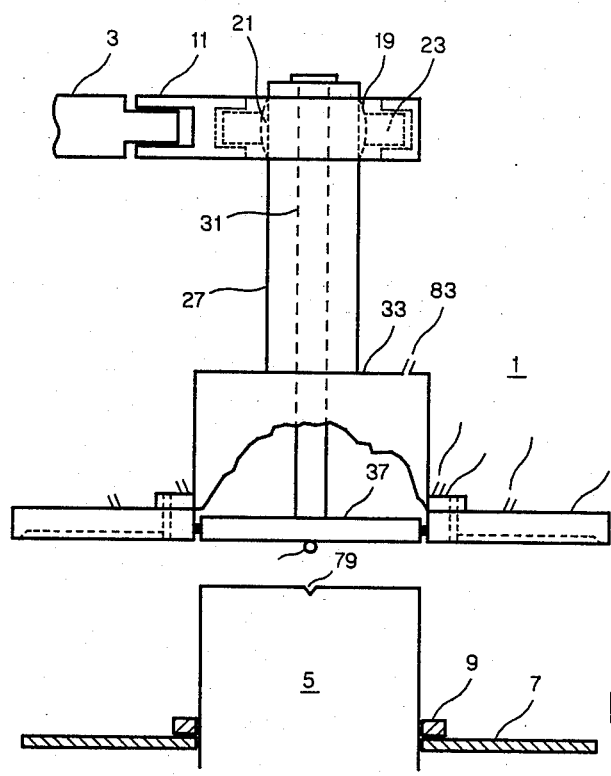
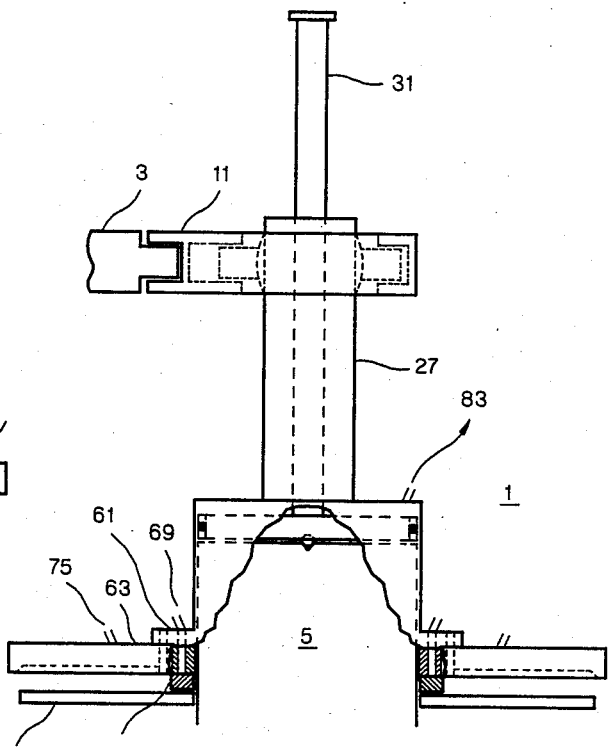
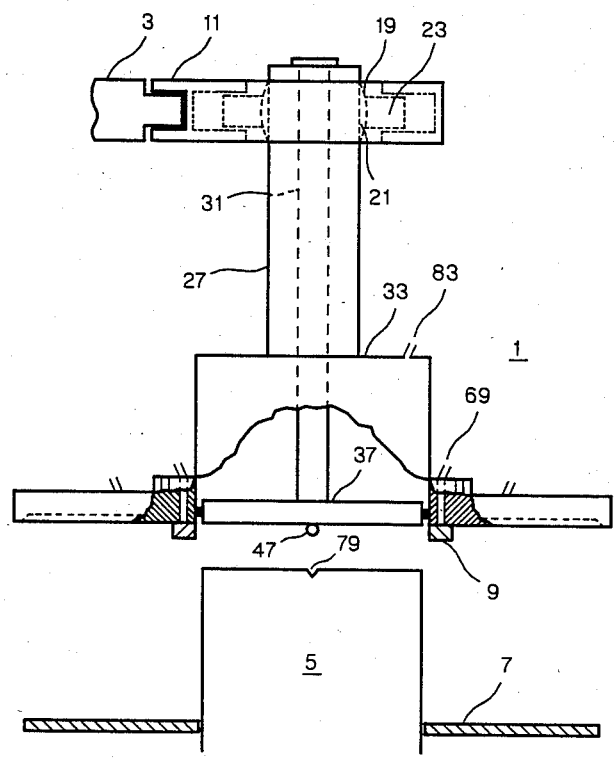
FIG. 5a
FIG. 5b
FIG. 5c

SELF ALIGNING, LOAD CAPACITY ENHANCING, WORKPIECE HANDLING DEVICE FOR USE WITH A ROBOTIC SYSTEM

BACKGROUND OF THE INVENTION

The present invention, a robotic arm attachment tool, relates to the field of workpiece handling, and in particular to the field of workpiece handling tools for use with robotic systems.

At an ever increasing rate, robot systems are being used to accomplish repetitive tasks requiring detailed, accurate operations. A properly programmed robot can complete a number of operations in a precise, repeatable sequence. The versitility of such systems is greatly expanded by ever-increasing programming capabilities, precision control mechanisms, and enhanced load handling abilities. Much of this increased versitility is derived from the utilization of robot systems with the capability of having specialized tools attached to their arm. The present invention is just such a specialized tool for attachment to the arm of a robot system.

One specific problem faced is having a robot that can be controlled with precision for detailed work, while, at the same time, also having sufficient load handling capacities. The present invention addresses this problem by providing a tool that can precisely center itself on a workpiece to be handled, as the robot moves the tool into place to engage the workpiece, and by also providing a tool that has an independent load enhancement capability, allowing the tool to selectively apply additional lifting capacity to load or unload workipeces on the apparatus to which the workpiece is initially mated.

One field in which the use of robot systems is increasing is computer and data processing unit construction and assembly. In particular, in the assembly of magnetic and optical disk information storage units, the data recording disks are especially fragile and easily contaminated, such as when the media surface come in contact with the skin of an assembler/dissassembler. Even the thin film of oil deposited on the media resulting from contact with human skin can severly impair the data recording capability of the disk. The more times a disk is handled, the greater is the potential for this damage to the disk. The present invention addresses that problem by providing an automated means of handling such disks, not only during the initial manufacture and assembly of the disk into it's operating unit, but especially during the dissassembly of the unit for repair or remanufacture processing.

In particular, this invention provides a means for removing a disk that is tightly seated to the hub, a situation commonly encountered during repair or remanufacture. The close tolerance fit between a disk and the hub on which it is mounted can make removal particularly difficult. If the disk binds to the hub, removal by manual means will generally result in the damage or contamination of the disk. Under the prior art, removal by an automated means such as a robot has been difficult because the high force needed to remove the disk could not be achieved by a robot arm also having the precise control necessary to properly engage a disk mounted on a hub. The present invention addresses the problem by allowing a precision control robot arm to be used and by having an independent load handling enhancement means located in the tool itself, said means being selectively activated once the tool has engaged the disk.

BRIEF SUMMARY OF THE INVENTION

The disclosed invention is a tool for attachment to the arm of a programmable robot. The tool engages differently configured workpieces, senses the specific type of workpiece engaged, and handles the specific workpiece so engaged. In the preferred embodiment, the tool handles data recording disks and the spacer rings used to separate the disk in shipping and when installed in an information storage magnetic or optical disk unit. The tool is comprised of: a means for attaching the tool to the robot arm; a gimbaling bearing, which allows the working head of the tool to both freely pivot and to translate in a horizontal plane; a hollow sleeve, the sleeve itself attached through the center of the bearing such that a piston rod can be slidably connected to the bearing; a piston rod, the lower end sealably passing through a hole in the top of a cylindrical housing and connected to a disk shaped piston; a cylindrical housing having a piston sealably deposed therein, such that the housing and the top of the piston form an expandable pressurizable chamber, and; a workpiece engaging member, which has a fixed head disposed around the cylindrical housing and a floating head slidably attached around and to the fixed head.

The fixed head has an annular vacuum ring disposed on its underside which engages and handles a spacer ring. A closed chamber is formed between the open-bottomed annular ring and the upper surface of the spacer, which is firmly fixed to the ring when a negative pressure is applied to the ring. The floating head engages the disk to be handled, and a closed chamber is formed by an outer flange on the rim of the floating head, the outside wall of the fixed head annular ring, and the disk, said disk firmly held to the tool by the suction of the negative pressure applied through the floating head. In this preferred embodiment, the disk is further held to the tool by the suction of the inner annular ring upon the inside uncoated surface of the disk in the same manner as is a spacer ring. The tool has a centering device for precisely centering the tool over the hub for accurate engagement of the fixed and floating heads upon the workpieces to be handled.

In operation, the tool is moved into a generally central position over the hub upon which the disks and spacers are mounted. The robot arm then lowers the tool onto the hub. The centering device, a ball and shaft arrangement which is slidably mounted into the piston and piston rod, projects down below the piston and engages a notch in the hub, said notch used to hold the hub during machining. As the ball slides into the notch it causes the shaft, and in turn the tool, to horizontally translate so as to be precisely centered over the tool. As the piston engages the hub, the gimbaling bearing allows the piston and the housing to pivot so as to be flush against the head should the hub not be precisely level. With the piston is centered and flush against the hub, the continued downward movement of the tool causes the housing to slide downward around the hub until such time as the heads encounter either, a spacer ring sitting on top of a disk, or a disk. Should the inner ring engage a spacer ring, only the first, inner, negative pressure is activated, fixing the spacer ring to the tool. If a disk is encountered, both the inner and a second, outer, negative pressure means are applied. Once the workpiece is fixed to the tool, the positive pressure means is applied to the interior of the housing. The positive pressure causes the chamber to expand, with the housing, the sleeve and the robot arm all rising, while the piston and piston rod remain stationary on the hub. Once the housing is off the hub and fully raised, the entire tool is lifted off the hub by the robot arm, and, a locking device for the tool activated. The robot then moves the workpiece to the new location. Once located in the new position the above described procedure is reversed, releasing the workpiece.

It is an object of this invention to provide a means for reducing the damage to workpieces, such as data recording disk, caused by the handling of said workpieces.

It is another object of this invention to provide a means for automatically handling workpieces such as a data recording disk.

It is a further object of this invention to provide a means for precisely positioning a robot arm and tool for the handling of a workpiece such as a data recording disk.

It is yet another object of this invention to provide a means for enhancing the load lifting capacity of a robot system for handling workpieces such as data recording disks.

It is still yet another object of this invention to provide a means for handling a plurality of differently configured workpieces such as data recording disks and their associated spacer rings.

BRIEF DESCRIPTION OF THE DRAWINGS

FIGS. 5a, 5b, and 5c are schematic representations of the preferred embodiments showing the operation of the robot and tool handling a spacer ring.

DESCRIPTION OF THE PREFERRED EMBODIMENT

Figure 1:
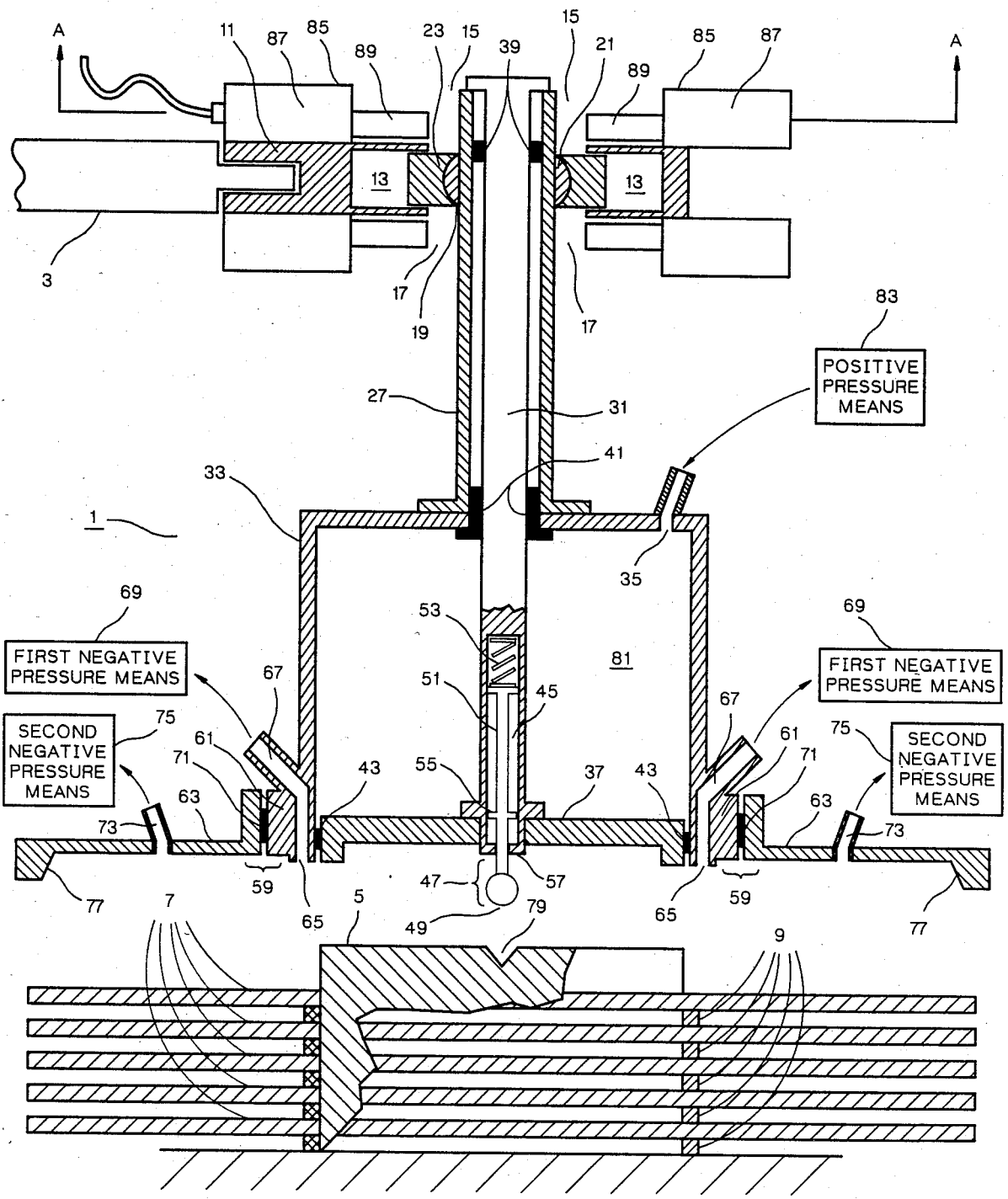
FIG. 1 is a cross-section view of the disclosed invention.

FIG. 1 shows the preferred embodiment of the disclosed invention, a recording disk handling tool 1, attached to a robot arm 3 and disposed over a hub 5 of a data storage unit, having mounted thereon a plurality of disks 7 and spacers rings 9. The tool 1 is comprised of coupler 11 which attaches the tool 1 to the robot arm 3. The coupler 11, as shown in FIG. 2, has a disk shaped cavity 13 with upper 15 and lower 17 openings.

Figure 2:
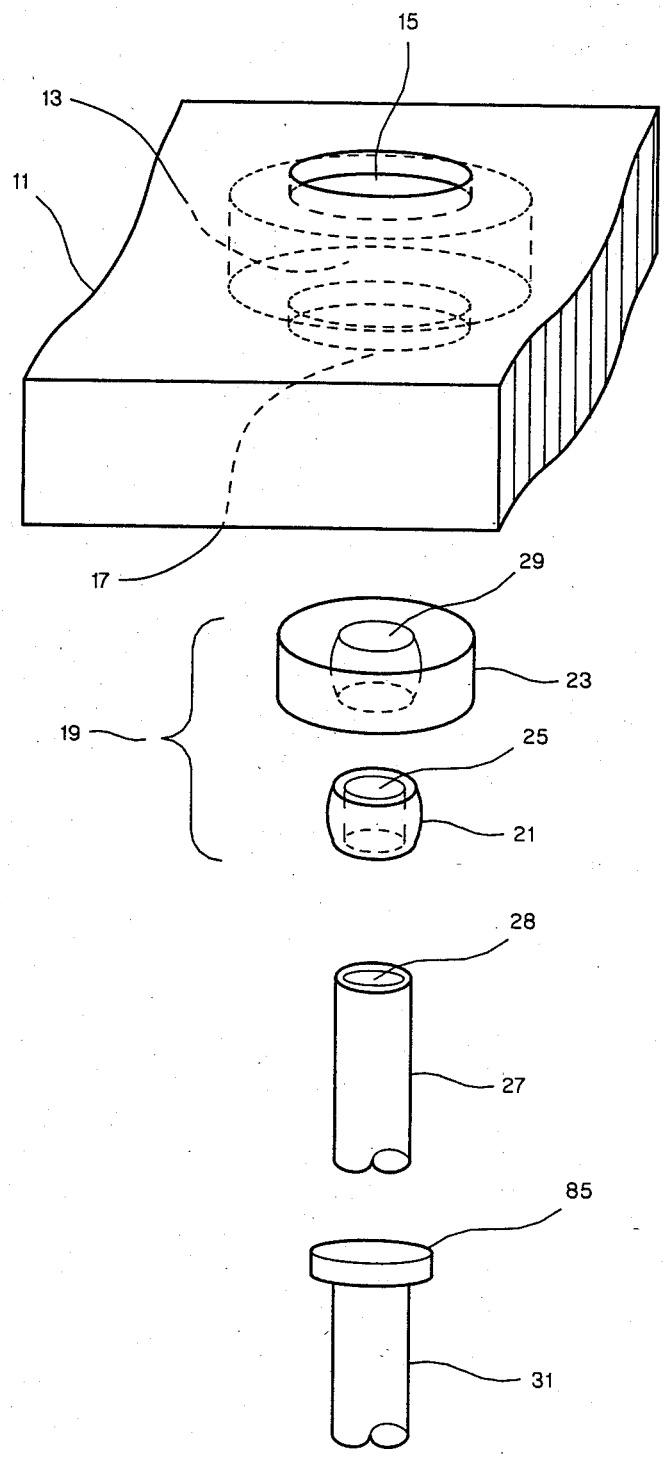
FIG. 2 is an exploded view of the gimbaling, transverse moving, and sliding means of the disclosed invention.
Figure 3:
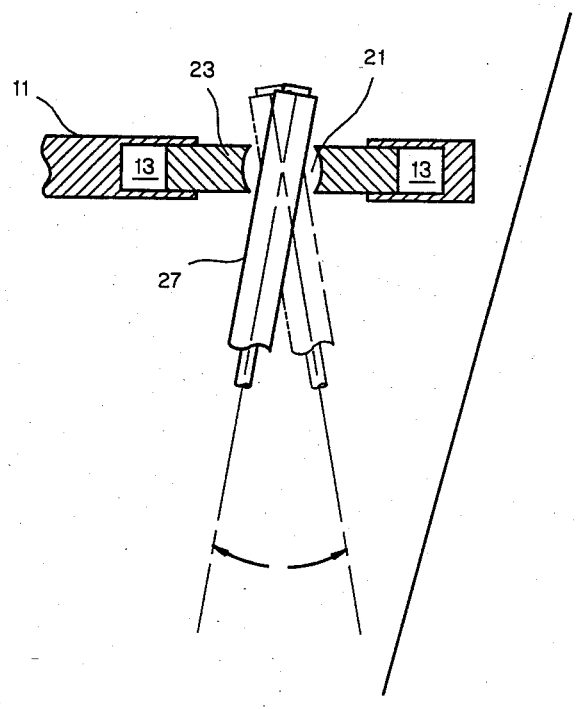
FIG. 3 is a partial side view of the preferred embodiment of the disclosed invention, showing the gimbal movement of the sleeve and piston rod.
Figure 4A:
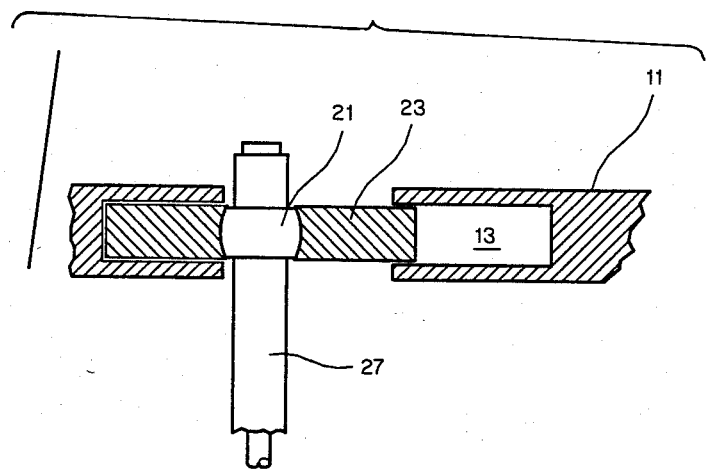
FIGS. 4a and 4b are partial side views of the preferred embodiment of the disclosed invention showing the transverse movement of the sleeve and piston rod.
Figure 4B:
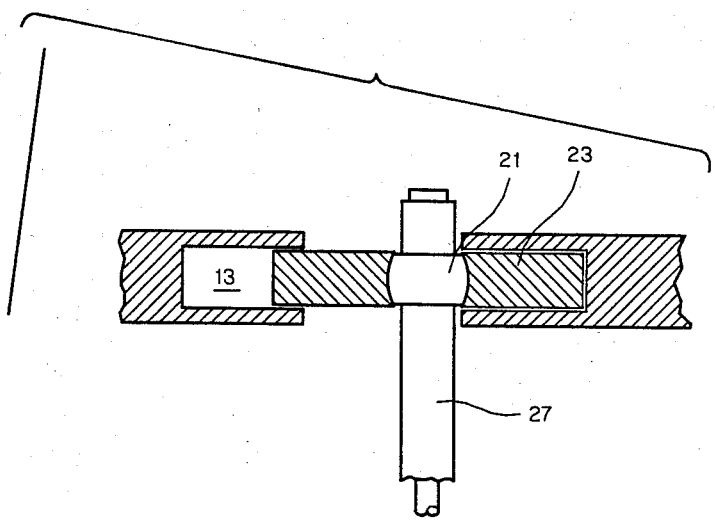

As shown in FIGS. 1 and 2, a bearing assembly 19, having an inner bearing member 21 and an outer bearing member 23, is slidably disposed within the cavity 13. The inner bearing member 21 is spherically shaped and has a hole 25 therein for the fixed mounting of a sleeve 27. The outer bearing member 23 is disk shaped, and has an inner, spherically shaped hole 29, into which the inner bearing 21 is mounted for free rotation within the hole 29. The cavity 13 is of a diameter and height greater than the outer bearing 23; with the holes 15 and 17 having diameters smaller than the diameter of the outer bearing 23, but larger than the diameter of the hole 25 in the inner bearing 21. Thus, as shown in FIGS. 3, 4a, and 4b respectively, when sleeve 27 is fastened to the inner bearing 21 through hole 25, and the bearing assembly 19 is located in cavity 13, the sleeve 27 is fully free to gimbal about the center pivot point of the inner bearing 21, and is also free to move transversely in a horizontal plane via the lateral movement of the entire bearing assembly 19 within the cavity 13. This free movement, both to gimbal and to move transversely, allows the lower portion of the tool 1 to adjust so as to properly seat on the disk or spacer, even if the workpiece is off-center on the hub 5, or the hub 5 is off-level or off-center from its correct position.

As shown in FIGS. 1 and 2, the sleeve 27 has a hole 28 which allows passage of a piston rod 31, The bottom portion of the sleeve 27 is fixedly attached to the top of a piston housing 33. The piston rod 31 is slidably guided through the sleeve 27 by means of bushing 39 and seal 41.

The piston housing 33 is a cylindrically shaped, open-bottomed structure having a diameter which will closely pass over the hub, a center opening in the top enclosed portion for passage of the piston rod 31, an opening 35 in the upper portion of the cavity for communication of the interior 81 of the housing 33 with a positive pressure means 83. Also, in this preferred embodiment, the lower outer periphery of the housing 33 integrally forms a fixed head portion 61 of a head assembly 59.

A piston 37 is connected to the lower end of the piston rod 31 and is slidably disposed within the piston housing 33 so as to allow the housing 33 to reciprocate in an upward and downward motion around the stationary piston 37.

The piston 37 is sealably mounted in the piston housing 33 by means of seal 43. The downward movement of the piston 37 is stopped by a shoulder 85 fixed to the top of the piston rod 31, said shoulder 85 resting on the top of the sleeve 27.

Located in the bottom end of the piston rod 31, and through the piston 37, in a passage 45 for that purpose is the tool centering assembly 47 having, a centering ball 49 attached to a stem 51, said stem 51 being slidably disposed in the passage 45, the lower portion of which projects down below the piston rod 31 and piston 37, and a spring 53 which urges the stem 51 and ball 49 downward. The downward movement of the stem 51 is stopped by cooperation of a notch 55 located on the stem 51 and a lip 57 formed on the bottom tip of the piston rod 31.

The vacuum head assembly 59 has a fixed head component 61 and a floating head component 63. The fixed head 61 has an inverted U-shaped annular chamber 65, and is disposed around the bottom of the housing 33 as an integral portion of said housing 33. A plurality of openings 67 pass through the upper portion of the fixed head 61 to allow communication between the annular chamber 65 and a first negative pressure means 69.

The floating head 63 is a disk-shaped structure slidably mounted around the fixed head 61 by sliding seal 71 such that floating head 63 can slide upward and downward in relation to the fixed head 61. The floating head 63 has a plurality of ports 73 through which communication with a second negative pressure means 75 is made, and has a downward projecting flange 77 around the outer perimeter of the floating head 63.

Figure 7:
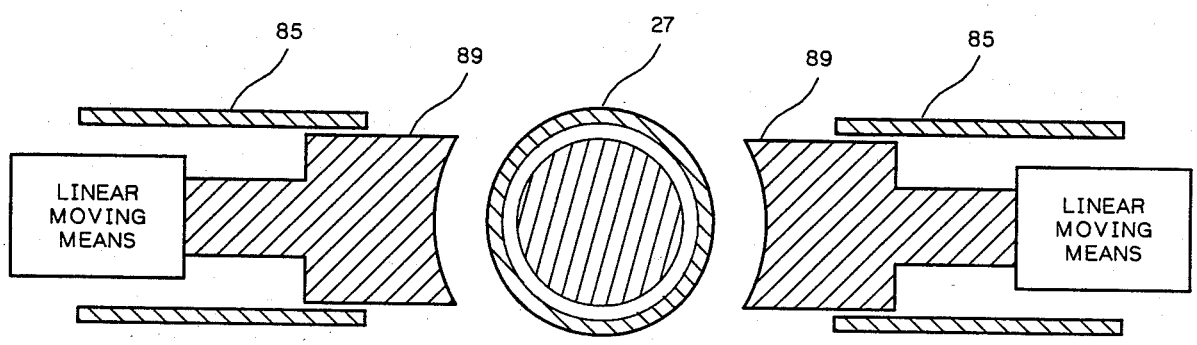
FIG. 7 is a cross section A—A of FIG. 1 schematic view of the preferred embodiment showing the means for rigidly holding and centering the sleeve and piston rod.

A centering and locking collar 85 is mounted on the coupler 11. As shown in FIG. 7, the collar 85 has, a set of jaws 89 which, when engaged, contact the sleeve 27 and move the sleeve 27 to central position and thereafter hold the sleeve 27 rigidly in place. The center and locking collar 85 also has a means for selectively engaging and restricting 87 said jaws 89.

In operation, as shown in FIGS. 5a-c the robot arm 3 moves the tool 1 into a generally centered position over the device containing the recording disks 7, in this case, hub 5. The robot arm 3 then lowers the tool 1 toward the disks 7, the centering ball 49 making contact with some portion of a centering notch 79 in the hub 5. As the tool 1 slowly continues downward, the cooperation between the centering assembly 47 and the notch 79, cause the entire portion of the tool 1 connected to the bearing assembly 19 to move transversely so as to precisely center the tool 1 over the hub 5. As the tool 1 continues downward, the centering assembly 47 is depressed into the passage 45, with the piston 37 coming to rest on the hub 5. As the tool 1 continues downward, the housing 33 slips downward over the hub 5, causing the housing 33 to slide relative to the now stationary piston 37. The robot is programmed to stop continued descent of the robot arm 3 once the robot senses the fixed head 61 coming to rest, either on a spacer ring 9 or a disk 7.

Should the tool 1 encounter a spacer ring 9, only the first negative pressure means 69 is activated and the spacer ring 9 is fixed firmly to the fixed head 61 by the negative pressure applied to the spacer ring 9 as a result of the partial vacuum in the chamber composed of the U-shaped annular ring 65 and the upper surface of the spacer ring 9. Once the spacer ring 9 is firmly fixed to the tool 1, positive pressure means 83 is activated causing an increase in pressure in the now compressed volume of cavity 81. This pressure increase causes the housing 33 to move upward, the robot is programmed to sense this upward movement and allow free movement of same. Once the housing 33 has risen to the fully extended position, and is no longer disposed around the hub 5, the centering and locking collar 85 is engaged by activating means 87 which cause jaws 89 to contact and return the sleeve 27 to its central position and hold the tool 1 rigid during movement of the tool 1 by the robot arm 3 to a new location.

Once the robot arm 3 has moved the tool 1 to the location for deposit of the spacer ring 9, the above outlined procedure is reversed.

Figure 6:
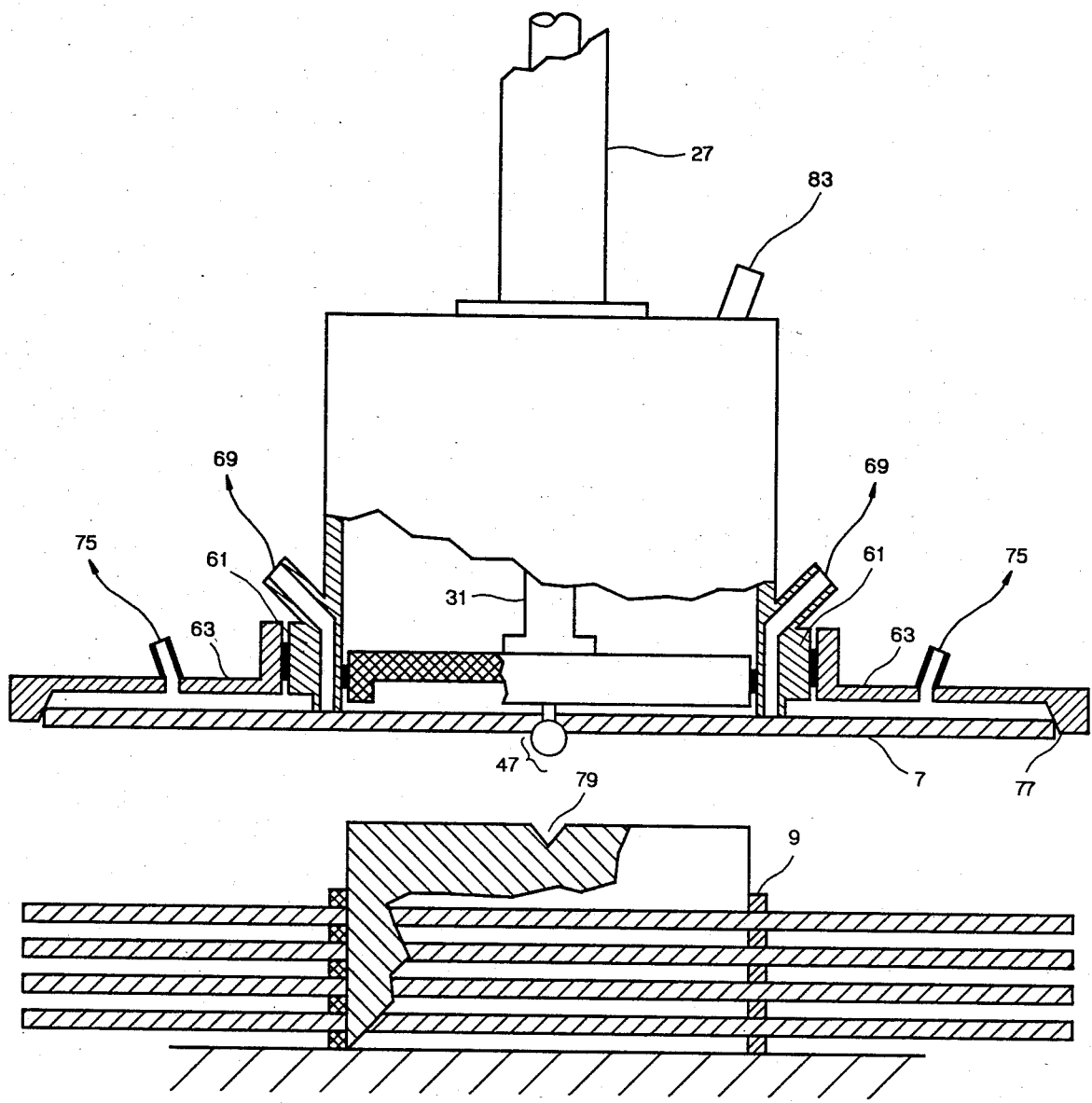
FIG. 6 is a partial representational side view of the preferred embodiment showing the tool with a recording disk fixed thereto.

As shown in FIGS. 5 and 6, where the tool 1 is to handle a disk 7, the housing 33 will continue downward until the annular flange 77, on the floating head 63 contacts the outer rim of the disk 7. Should the disk 7 be loaded off-center on the hub 5 one portion of the flange 77 will engage the disk 7 first, causing the disk to slide over until centered and there is complete around the entire perimeter of the disk 7. At this point, as the housing 33, continues downward, the floating head 63 comes to rest, and moves upward relative to the fixed head 61, which as part of the housing 33 continues downward. The housing 33 continues downward until the fixed head 61 engages the inner periphery of the disk 7, at which time the robot senses the housing 33 coming to rest and stops further downward movement. At this point both the first and the second negative pressure means 69 and 75 respectively are activated, fixing the disk 7 to tool 1 by the first partial vacuum chamber formed by the U-shaped cavity 65 and the inner periphery of the disk 7 and by means of the second partial-vacuum chamber formed by the floating head 63 the flange 77 the outside wall of the fixed head 61 and the upper surface of the disk 7.

Once the disk 7 is firmly fixed to the tool 1, the positive pressure means 83 is activated and the housing 33 and disk 7 are lifted upward by the pressure in the chamber 81. This load enhancement by means of the pressurization of the chamber 81 is particularly significant in that the disk 7 may be frozen to the hub 5 and the lifting capacity of the robot arm 3 alone generally being insignificant to lift disk 7 off the hub 5. The lifting capacity of the piston 37 housing 33 arrangement can be adjusted to the force necessary to remove the disk 7, but in practice the negative pressure holding the disk 7 to the tool 1 should be less than the maximum lifting power of the disk in order to prevent damage to the disk 7. After the housing 33 is fully raised, the locking and centering means 85 is again engaged and the tool 1 returned to a centered position. The robot arm 3 then moves the tool 1 to the predetermined position for deposit of the disk 7.

While this has been a description of the preferred embodiment of this disclosed invention, it is understood that the piston 37 housing 33 arrangement could be adopted to fit any appropriate configuration upon which the piston 37 would rest, and that the housing 33 need not necessarily descend downward over a given support. It is also understood that the fixed 61 and floating 63 heads could be adapted to accommodate a wide plurality of workpiece configurations, the only requirement being that the heads 61 and 63 be closely sized to the configuration of the workpieces to be handled in order to optimize the seal between the heads 61 and 63 and the workpiece to be handled.

We claim:

1. A robot arm attachment tool for handling a plurality of differently configured workpieces, comprising:

means for attaching said tool to the robot arm, said robot arm attaching means having an opening such that a vertically disposed support member is fully free to tilt within said robot arm attaching means;

means for the powered lifting of a workpiece to be handled;

means for adjustably connecting the powered lifting means to the robot arm attaching means, said means having, a vertically disposed support member, a lower end of which is attached to the powered lifting means, a bearing assembly, having an inner bearing member securely fastened to the vertically disposed support member and a disk shaped outer bearing member mounted in the robot arm attaching means, such that the vertically disposed support member is free to pivot about the center point of said inner bearing, and a disk-shaped cavity disposed within the means for attaching the tool to the robot arm, said cavity having its planar surfaces horizontally oriented, the disk-shaped outer bearing slidably mounted in the disk-shaped cavity such that the bearing assembly is free to translate within the horizontal plane defined by the planar surfaces of the cavity;

means for fixedly engaging a plurality of differently configured workpieces, said means attached to the means for powered lifting;

means for centering said tool over the workpiece to be handled so that means for engaging a workpiece will be properly positioned, and;

means for rigidly holding and returning the means for adjustably connecting the powered lifting means to the robot arm attaching means to a generally central position.

2. A robot arm attachment tool of claim 1 wherein the means for rigidly holding and returning the tool to a generally central position is comprised of:

selectively retractably clamp, said clamp disposed around the vertically disposed support member, said clamp having a plurality of jaws, which, when activated, urge the vertically disposed support member back to a central position, and means for selectively activating the jaws.

3. A robot arm attachment tool as recited in claim 2 wherein the means for powered lifting is comprised of:

a vertically oriented piston rod, said piston rod having the upper portion slidably mounted in the powered lifting connecting means, such that said piston rod can reciprocate upward and downward, and having the bottom end attached to a piston;

a pressurizable, cylindrically-shaped housing, having
an open bottom end for the free sliding movement of a disk-shaped piston,
an enclosed upper end, said upper end having a first opening for sealably passing the piston rod through to the interior of the housing,
a second opening in the upper portion of said housing for attachment of a positive pressure means, and
means for attachment of the workpiece engaging means to the exterior lower periphery of said housing;

a disk-shaped piston, said piston connected to the piston rod, said piston sealably and slidably disposed in the interior of the housing such that the upper surface of the piston and the interior walls of the housing form an enclosed pressurizable cavity, and the bottom of said piston resting on a support surface for the workpiece, such that when the cavity is pressurized, the positive pressure causes the housing to rise relative to the piston, said piston resting immobably on the workpiece support surface, and;

means for selectively applying positive pressure to the cavity formed by the housing and the piston.

4. A robot arm attachment tool of claim 3 wherein the means for fixedly engaging a plurality of workpieces is comprised of a vacuum head assembly having, a fixed head portion which can engage a first workpiece, said fixed head attached to the powered lifting means, and a floating head portion sealably and slidably attached to the fixed head, such that the floating head can continue downward to engage a second workpiece should the fixed portion engage and come to rest upon a first workpiece.

5. A robot arm attachment tool of claim 4 wherein the fixed head portion is further comprised of:

a first, inverted, U-shaped cavity, for closely engaging a fist workpiece, said first cavity disposed on the bottom of the fixed head and in communication with a first negative pressure means through a first port in the fixed head for that purpose, such that when the first cavity and the first workpiece are in sealed contact and negative pressure applied to the chamber thereby formed, the first workpiece is firmly fixed to the head, and;

a first negative pressure means.

6. A robot arm attachment tool of claim 5 wherein the floating head is further comprised of:

a second inverted U-shaped cavity, for closely engaging a second workpiece, said second cavity disposed on the bottom of the floating head and in communication with a second negative pressure means through a second port in the floating head for that purpose, such that when the second cavity and the second workpiece are in sealed contact and negative pressure applied to the chamber thereby formed, the second workpiece is firmly fixed to the floating head, and;

a second negative pressure means.

7. A robot arm attachment tool for loading and unloading a plurality of different diameter planar disks, comprising:

means for slidably attaching said tool to the robot arm;

means for the powered lifting of the disks, said robot arm attaching means having an opening such that a vertically disposed support member is fully free to tilt within said robot arm attaching means;

means for adjustably connecting the powered lifting means to the robot arm attaching means, said means having,
a vertically disposed support member, a lower end of which is attached to the powered lifting means,
a bearing assembly, having an inner bearing member securely fastened to the vertically disposed support member and a disk shaped outer bearing member mounted to the robot arm attaching means such that the support member is free to pivot about the center point of said inner bearing, and,
a disk-shaped cavity disposed within the means for attaching the tool to the robot arm, said cavity having its planar surfaces horizontally oriented, the disk-shaped outer bearing slidably mounted in the disk-shaped cavity such that the bearing assembly is free to translate within the horizontal plane defined by the planar surfaces of the cavity;

means for fixedly engaging a plurality of different diameter disks, said means attached to the means for powered lifting;

means for centering said tool over the disks for proper positioning of the disk engaging means relative to the disk, and;

means for rigidly holding and returning the means for adjustably connecting the powered lifting means to the robot arm attaching means to a generally central position.

8. A robot arm attachment tool as recited in claim 7 wherein the means for rigidly holding and returning the tool to a generally central position is comprised of:

a selectively retractably clamp, said clamp disposed around the vertically disposed support member, said clamp having a plurality of jaws, which, when activated, urge the vertically disposed support member back to a central position, and;

means for selectively activating the jaws.

9. A robot arm attachment tool as recited in claim 8 wherein the means for powered lifting is comprised of:
a vertically oriented piston rod, said piston rod having the upper portion slidably mounted in the powered lifting connecting means, such that said piston rod can reciprocate upward and downward, and having the bottom end attached to a piston;
a pressurizable, cylindrically-shaped housing, having
an open bottom end for the free sliding movement of a disk-shaped piston,
an enclosed upper end, said upper end having a first opening for sealably passing the piston rod through to the interior of the housing,
a second opening in the upper portion of said housing for attachment of a positive pressure means, and
means for attachment of the disk engaging means to the exterior lower periphery of said housing;
a disk-shaped piston, said piston connected to the piston rod, said piston sealably and slidably disposed in the interior of the housing such that the upper surface of the piston and the interior walls of the housing form an enclosed pressurizable cavity, and the bottom of said piston resting on a support surface for the disks, such that when the cavity is pressurized, the positive pressure causes the housing to rise relative to the piston, said piston resting immobably on the disk support surface, and;
means for selectively applying positive pressure to the cavity formed by the housing and the piston.

10. A robot arm attachment tool as recited in claim 9 wherein the means for engaging a plurality of different diameter disks comprises:
a first engaging means for fixedly engaging a first disk to be handled, the first disk having a smaller diameter than a larger diameter second disk, said first engaging means securely attached to the means for powered lifting, and;
a second engaging means for fixedly engaging a second disk to be handled, the second disk having a larger diameter than the first disk, said second engaging means slidably attached to the means for engaging the smaller diameter disk.

11. A robot arm attachment tool of claim 10 wherein the means for fixedly engaging a first disk to be handled is disposed around the outside lower circumference of the powered lifting means, said powered lifting means having a diameter smaller than the diameter of the first disk to be handled.

12. A robot arm attachment tool of claim 11 wherein the means for fixedly engaging a second disk to be handled is slidably disposed around the means to engage a first disk, such that the means for engaging a second disk can continue downward to engage a second disk should the first engaging means engage a first disk and come to rest.

13. A robot arm attachment of claim 12 wherein the means for engaging a first disk is further comprised of:
a first inverted U-shaped cavity, for closely engaging a first disk, said cavity disposed on the bottom of the fixed head, and in communication with a first negative pressure means through a first port in the fixed head for that purpose, such that when the first cavity and the first disk are in sealed contact and negative pressure applied to the chamber thereby formed, the first disk is firmly fixed to the head, and;
a first negative pressure means.

14. A robot arm attachment of claim 13 wherein the means for engaging a second disk is further comprised of:
a second inverted U-shaped cavity, for closely engaging a second disk, said cavity disposed on the bottom of floating head, and in communication with a second negative pressure means through a second disk such that when the second cavity and the second disk are in sealed contact and negative pressure applied to the chamber thereby formed, the second disk is firmly fixed to the floating head, and;
a second negative pressure means.

15. A robot arm attachment tool for loading and unloading information storage units data recording disks and spacer rings for said recording disks; comprising:
means for slidably attaching said tool to the robot arm, said means slidably attached to said arm so as to cause relative movement between the arm and tool when a disk engaging means has contacted and come to rest upon a spacer ring or disk to be handled, said robot arm attaching means having an opening such that the support member is fully free to tilt within said robot arm attaching means;
means for the powered lifting of the spacer rings and disks;
means for adjustably connecting the powered lifting means to the robot arm attaching means, said means having,
a vertically disposed support member, the lower end of which is attached to the powered lifting means;
a bearing assembly, having the inner bearing mounted in and fastened to the robot arm attaching means such that the support member is free to pivot about the center point of said bearing;
a disk-shaped cavity disposed within the means for attaching the tool to the robot arm, said passage having its planar surfaces horizontally oriented, the disk-shaped outer bearing slidably mounted in the disk-shaped cavity such that the bearing assembly is free to translate within the horizontal plane defined by the planar surfaces of the cavity;
means for fixedly engaging the disks and the spacer rings, said means attached to the means for powered lifting;
means for centering said tool over the disks for proper positioning of the disk engaging means relative to the disk, and;
means for rigidly holding and returning to a generally central position said adjustable connecting means.

16. A robot arm attachment tool as recited in claim 15 wherein the means for rigidly holding and returning to a centered position is comprised of:
a selectively retractable clamp, said clamp disposed around the vertically disposed support member, said clamp having a plurality of jaws, which, when activated, urge the vertically disposed support member back to a generally central position;
means for selectively activating the jaws.

17. A robot arm attachment tool as recited in claim 16 wherein the means for powered lifting is comprised of:
a vertically oriented piston rod, said piston rod having the upper portion slidably mounted in the powered lifting connecting means, such that said piston rod can reciprocate upward and downward, and having the bottom end attached to a piston;

a pressurizble, cylindrically-shaped housing, having
an open bottom end having a first opening for sealably passing the piston rod through to the interior of the housing,
a second opening in the upper portion of said housing for attachment of a positive pressure means;
means for attachment of the means for engaging a spacer on the exterior lower periphery of said housing;
a disk-shaped piston, said piston connected to the piston rod, said piston sealably and slidably disposed in the interior in the housing such that the upper surface of the piston and the interior walls of the housing form an enclosed pressurizable cavity, and the bottom of said piston resting on a support surface for a spacer such that when the cavity is pressurized, the positive pressure causes the housing to rise relative to the piston, said piston resting immobably on the spacer, and;
means for selectively applying positive pressure to the cavity formed by the housing and the piston.

18. A robot arm attachment tool as recited in claim 17 wherein the means for engaging a spacer ring and a recording disk is comprised of:
a vacuum head assembly, having a fixed head portion which can engage a spacer, attached to the powered lifting means, and a floating head portion which is sealably and slidably attached to the fixed head, such that the floating head can continue downward to engage the outer portion of a disk should the fixed portion engage and come to rest upon the inner portion of the disk.

19. A robot arm attachment tool of claim 18 wherein the fixed-head portion is further comprised of:
a first inverted U-shaped cavity, for closely engaging a spacer ring, said cavity disposed on the bottom of the fixed head, the cavity in communication with a first negative pressure means through a plurality of first ports in the fixed head for that purpose, such that when the cavity and the spacer ring are in sealed contact and negative pressure applied to the chamber thereby formed, the spacer ring is firmly fixed to the fixed head, and;
a first negative pressure means.

20. A robot arm attachment tool of claim 19 wherein the floating head is further comprised of:
a second inverted U-shaped cavity, for closely engaging a disk, said cavity disposed on the bottom of the floating head, the second cavity in communication with a second negative pressure means through a plurality of second ports in the floating head for that purpose, such that when the second cavity and the disk are in sealed contact and negative pressure applied to the chamber thereby formed, the disk is firmly fixed to the floating head, and
a second negative pressure means.

21. A robot arm attachment tool of claim 20 wherein the first cavity engages the inner periphery of the disk and further fixes the disk to the head assembly.

22. A robot arm attachment tool of claim 21 wherein the means for centering is comprised of:
a centering ball;
a support shaft, the bottom end attached to the centering ball, the top portion slidably located in a vertical hole in the piston and piston rod, said piston and piston rod each having a hole for that purpose;
a compression spring disposed around the support shaft and projecting a portion of the shaft, and the attached ball, downward beyond the lower face of the piston; such that as the tool is lowered onto a hub around which the recording disks and spacer rings are mounted, the ball will contact some portion of the center hole on the hub, causing said tool to center over said hub as tool descends and seats on the hub, the support shaft retracting into the piston/piston rod hole.

* * * * *